(12) United States Patent
Marcus, Jr.

(10) Patent No.: US 9,855,715 B2
(45) Date of Patent: Jan. 2, 2018

(54) TIRE BUILDING DRUM WITH INCREASED RANGE OF MOVEMENT

(71) Applicant: Davian Enterprises, LLC, Greenback, TN (US)

(72) Inventor: Robert L. Marcus, Jr., Knoxville, TN (US)

(73) Assignee: Davian Enterprises, LLC, Greenback, TN (US)

(*) Notice: Subject to any disclaimer, the term of this patent is extended or adjusted under 35 U.S.C. 154(b) by 218 days.

(21) Appl. No.: 14/295,828

(22) Filed: Jun. 4, 2014

(65) Prior Publication Data

US 2014/0360673 A1 Dec. 11, 2014

Related U.S. Application Data

(60) Provisional application No. 61/832,544, filed on Jun. 7, 2013.

(51) Int. Cl.
*B29D 30/24* (2006.01)

(52) U.S. Cl.
CPC .......... *B29D 30/242* (2013.01); *B29D 30/24* (2013.01); *B29D 30/246* (2013.01)

(58) Field of Classification Search
CPC .......... B29D 30/24; B29D 2030/2642; B29D 2030/265; B29D 2030/2657; B29D 30/242; B29D 30/244; B29D 30/246
See application file for complete search history.

(56) References Cited

U.S. PATENT DOCUMENTS

| 1,233,567 A | 7/1917 | Furry |
| 1,750,728 A | 3/1930 | Robison |
| 2,168,897 A | 8/1939 | Bostwick |
| 2,201,469 A | 5/1940 | Bostwick |
| RE22,369 E | 8/1943 | Bostwick |

(Continued)

FOREIGN PATENT DOCUMENTS

| DE | 102009003507 | * | 8/2010 | ............. B29D 30/26 |
| JP | 2000-254982 | * | 9/2000 | ............. B29D 30/24 |
| JP | 2007-98664 | * | 4/2007 | ............. B29D 30/24 |

OTHER PUBLICATIONS

Machine generated English language translation of DE 102009003507 (original document dated Aug. 2010).*

(Continued)

*Primary Examiner* — Martin Rogers
(74) *Attorney, Agent, or Firm* — Pitts & Lake, P.C.

(57) ABSTRACT

A tire building drum is disclosed. A thrust plate is mounted at a tapered end of a central shaft. An actuator is slidable along the shaft between first and second positions. Arcuate segments are arranged in a circumferential relationship about the shaft to define a working surface. First guide rails are slidably secured to the thrust plate, with a first end of each first rail mounted near a first end of one of the segments and a second end extending radially inwardly along the thrust plate. Second guide rails are slidably secured to the actuator, with a first end of each second rail mounted near a second end of one of the segments and a second end extending radially and axially inwardly along the actuator. Each of the guide rail second ends extends radially inward toward the inwardly tapered shaft portion when the actuator is in the first position.

16 Claims, 12 Drawing Sheets

(56) References Cited

U.S. PATENT DOCUMENTS

| | | |
|---|---|---|
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Pouilloux |
| 3,111,445 A | 11/1963 | Pouilloux et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,817,812 A * | 6/1974 | Yabe ................. B29D 30/24 |
| | | 156/415 |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A * | 3/1984 | Long ................. B29C 53/824 |
| | | 156/415 |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A * | 6/1993 | Miyanaga ............ B29D 30/32 |
| | | 156/398 |
| 5,225,028 A | 7/1993 | Bierens |
| 5,232,542 A * | 8/1993 | Norjiri .................. B29D 30/70 |
| | | 156/417 |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,505,803 A | 4/1996 | Byerley |
| 5,558,733 A | 9/1996 | Byerley |
| 5,618,374 A | 4/1997 | Byerley |
| 5,635,016 A | 6/1997 | Byerley |
| 5,709,768 A | 1/1998 | Byerley |
| 5,735,995 A | 4/1998 | Bull et al. |
| 5,755,922 A | 5/1998 | Baldoni et al. |
| 5,906,836 A * | 5/1999 | Panaroni .............. B29C 44/043 |
| | | 156/404 |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,390,166 B1 | 5/2002 | Roberts et al. |
| 6,457,505 B1 | 10/2002 | Byerley |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 2002/0011312 A1* | 1/2002 | Tokunaga ............ B29D 30/247 |
| | | 156/414 |
| 2003/0197389 A1 | 10/2003 | Moilanen et al. |
| 2008/0202690 A1 | 8/2008 | Painter |
| 2009/0056879 A1 | 3/2009 | Painter |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |

OTHER PUBLICATIONS

Machine generated English language translation of JP 2000-254982 (original document dated Sep. 2000).*
Machine generated English language translaton of JP 2007-98664 (original document dated Apr. 2007).*
European Patent Office, Supplementary European Search Report, EPO Form 1503 03.82, dated Nov. 17, 2016.

* cited by examiner

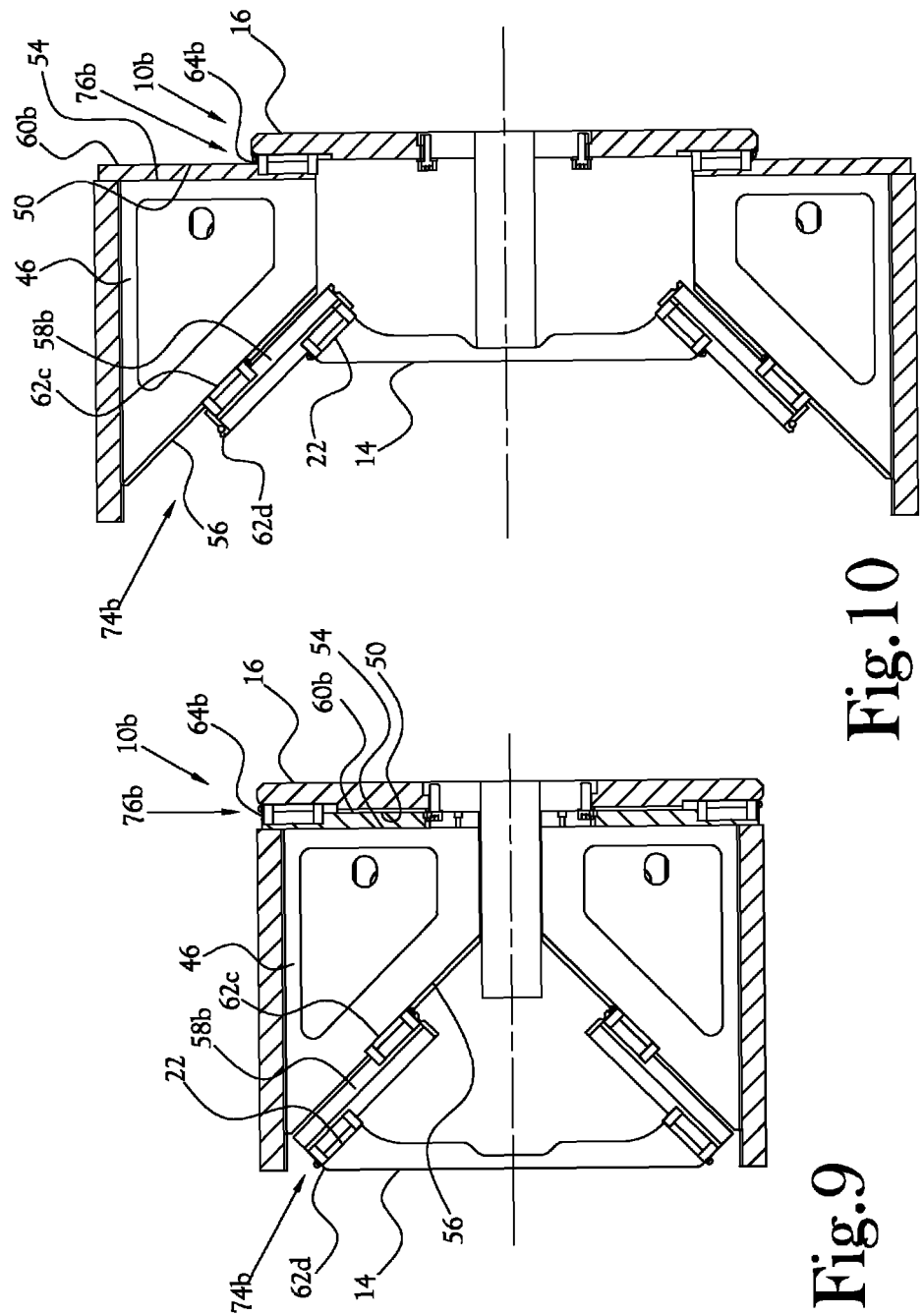

TIRE BUILDING DRUM WITH INCREASED RANGE OF MOVEMENT

CROSS-REFERENCE TO RELATED APPLICATIONS

This application claims the benefit of U.S. Provisional Application No. 61/832,544, filed Jun. 7, 2013, incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The present general inventive concept relates to tire building equipment, and more particularly, to a tire building drum useful in the assembly of a tire component for subsequent use in the assembly of a tire.

2. Description of the Related Art

The manufacture of a vehicle tire commonly includes the steps of forming a tire carcass, forming a belt and tread portion of the tire separately of the carcass, and thereafter marrying the belt and tread portion of the tire to the carcass to form a "green" tire. The green tire is thereafter treated to form the tread and various other features of the tire.

Formation of the various portions of a tire is typically accomplished using one or more tire building drums of the type defining a cylindrical working surface. For example, formation of the belt and tread portion of the tire is typically accomplished on a type of tire building drum commonly referred to as a "belt and tread drum." Such a drum has an outer cylindrical surface, or circumference, about which one or more layers of tire belt material (such as, for example, reinforcement cords embedded in a polymeric binder) are laid. Subsequent to laying down the tire belt material, the tire belt material is overlaid with one or more layers of strip tread material to comprise a "belt and tread package." The circumference of a belt and tread drum is preferably capable of expanding and contracting in order to, for example, accommodate the removal of a completed belt and tread package (which is essentially nonexpandable radially) from the drum circumference and to enable a single drum to be used to form belt and tread packages of alternative diameters. For example, the circumference of a belt and tread drum can be collectively comprised of a plurality of rigid arcuate segments, wherein each segment provides a portion of the cylindrical surface of the drum and is mounted for movement toward and away from the longitudinal axis of the drum to accommodate expansion and contraction of the drum circumference.

A tire carcass is formed on another type of tire building drum, known as a "carcass drum," in a manner somewhat similar to the forming of a belt and tread package discussed above. Thus, a carcass drum used in forming a tire carcass may also be expandable and contractible as described above. After the tire carcass has been formed, it may be transferred, using a type of tire building drum known as a "transfer ring," to a second stage tire building drum. On the second stage drum, the tire carcass is held while a transfer ring is used to transfer a belt and tread package from a belt and tread drum onto the outer circumference of the tire carcass. Thereafter, the belt and tread package is married to the carcass. A commonly employed transfer ring may be considered as an inverted belt and tread drum. That is, whereas the outer circumference of a belt and tread drum is adjustable to accommodate the formation of the belt and tread package thereon and to permit the removal therefrom of a completed belt and tread package, a transfer ring defines an inner circumferential surface that is adjustable in diameter to permit the transfer ring to encompass the outer circumference of the belt and tread package and contract in diameter to cause the segments of the transfer ring to engage and grasp the belt and tread package to allow transfer of the package to the carcass of the tire.

Prior art tire building drums of the type described above typically include devices for moving the circumference-defining segments of the drum toward and away from the longitudinal axis of the drum to accommodate adjustment of the diameter of the drum circumference. For example, such devices may comprise one or more cam elements which slidably engage radially-extending guides provided on axially-movable structures at the opposite longitudinal ends of the drum, such that the cam elements are slidable with respect to the drum centerline along the radially-extending guides. These cam elements are, in turn, secured in relation to inner surfaces of the circumference-defining segments of the drum. At least one of the axially-movable structures defines a tapered shape. Thus, by moving the axially-movable structures toward one another, the cam elements are urged outwardly from the longitudinal centerline of the drum along the radially-extending guides of the axially-movable structures, and the circumference-defining segments are therefore urged outwardly from the longitudinal centerline of the drum. The result is an outward expansion of the working surface of the drum defined by the circumference-defining segments secured in relation to the cam elements. Conversely, by moving the axially-movable structures away from one another, the cam elements and associated circumference-defining segments are drawn inwardly toward the longitudinal centerline of the drum, thereby contracting the working surface of the drum. Examples of this type of tire building drum are described and illustrated in U.S. Pat. No. 5,066,354, issued to Benjamin; U.S. Pat. No. 5,232,542, issued to Norjiri et al.; and U.S. Pat. No. 5,264,068, issued to Masuda.

The above-described prior art devices are limited with respect to the extent to which the circumference-defining segments may be moved. More specifically, the extent to which the circumference-defining segments may be expanded and contracted in the above-described prior art devices is limited by the extent to which each of the cam elements may travel along the radially-extending guides. If one or more of the cam elements travels beyond the distal limits of its associated radially-extending guide, the stability of the associated circumference-defining segment may be compromised, such that a non-uniform circumferential surface of the tire building drum is created, thereby leading to inaccuracies formed within a tire component built upon or engaged by the circumferential surface of the tire building drum. Furthermore, in many prior art tire building drums, the presence of mounting equipment and other structures along the central axis of the tire building drum limits the extent to which the radially-extending guides may extend inwardly toward the central axis of the drum. Thus, in many prior art tire building drums, the radially-extending guides extend from the outer circumference of the tire building drum radially inwardly, but terminate at a partial distance along the radius of the tire building drum. Thus, the above-described prior art tire building drums are typically only capable of radial expansion and contraction within a range of approximately 1.4 to 1.

Certain prior art tire building drums have been developed with the goal of obtaining an increased range of expansion and contraction of the tire building drum. One such prior art tire building drum is described and illustrated in U.S. patent application Ser. No. 13/374,448, filed by Byerley (hereinafter "Byerley"). The tire building drum of Byerley includes a thrust plate and a conical actuator disposed at opposite longitudinal ends of the tire building drum, and a plurality of tapered ramp members arranged in a cylindrical configuration between the thrust plate and actuator, each ramp member being secured to an interior surface of a circumference-defining segment of the drum. Pairs of guide blocks are interposed between the thrust plate and each of the ramp members, and between each of the ramp members and the actuator, with each guide block defining a radially-extending channel which faces an associated guide block. For each pair of radially-extending guide blocks, a linear guide member slidably engages both channels in the pair of guide blocks. Thus, in the Byerley device, each guide block associated with a ramp member may slide in relation to an associated linear guide member, and each linear guide member may slide in relation to an associated guide block secured to either the thrust plate or the actuator. Thus, the effective range of movement of each ramp member in relation to the thrust plate and actuator exceeds the overall length of the associated linear guide member.

In prior art tire building drum devices, tolerances or other such dimensional allowances between mating surfaces of the above-discussed cam elements and associated guide rails may, in some instances, allow the circumference-defining segments of the tire building drum to move slightly in relation to other circumference-defining segments of the drum or in relation to the central axis of the drum. Any such movement of the circumference-defining segments superfluous to the desired expansion and contraction movement of the segments could result in variation of the cylindrical configuration of the circumference-defining segments, thereby resulting in non-uniformity of tires formed using the tire building drum. Thus, superfluous movement of the circumference-defining segments in relation to one another or in relation to the central axis of the drum is generally undesirable.

In light of the above, while devices similar to the above-described tire building drum of Byerley may allow for increased range of expansion and contraction of the circumferential working surface of the drum, such devices may allow superfluous movement of the ramp members and associated circumference-defining segments as a result of additional tolerances interposed between each of the linear guide members and associated pairs of guide blocks. Accordingly, it is desirable to produce a tire building drum having an increased range movement, but which also limits superfluous movement of the circumference-defining segments forming the working surface of the drum throughout expansion and contraction of the drum.

BRIEF SUMMARY OF THE INVENTION

Example embodiments of the present general inventive concept provide a tire building drum for forming a component of a tire, in which the drum has a central axis and opposite first and second axial ends. Example embodiments of the present general inventive concept can be achieved by providing a shaft extending along the axis, the shaft defining an outer circumference and an inwardly tapered portion proximate the first axial end, along with a plurality of substantially arcuate segments arranged in a side-by-side circumferential relationship with respect to one another about the shaft to define a segmented, radially expandable and collapsible cylindrical outer working surface, each segment having a first end proximate the drum first axial end and a second end proximate the drum second axial end. Some embodiments may provide an annular thrust plate extending radially outwardly from the shaft axially outward of the tapered portion, the thrust plate defining a substantially planar axially interior surface. An annular actuator may be received about the shaft and movable along the axis between a first position proximate the drum second end and a second position proximate the drum first end, the actuator defining a radially and axially inwardly tapered annular outer surface. A plurality of first linear guide rails may be provided, each first linear guide rail having a first end secured proximate the first end of one of the segments and a second end extending radially inwardly along the thrust plate interior surface. A plurality of second linear guide rails may be provided, each second linear guide rail having a first end secured proximate the second end of one of the segments and a second end extending radially and axially inwardly along the actuator outer surface. Some embodiments provide the thrust plate slidably secured to each first linear guide rail and the actuator slidably secured to each second linear guide rail, with each of the second ends of the first and second linear guide rails extending radially inward of the shaft outer circumference toward the shaft inwardly tapered portion when the actuator is in the first position. In some embodiments, each of the first and second linear guide rails moves radially outward along the thrust plate interior surface and the actuator outer surface in response to movement of the actuator toward the second position, thereby moving each of the segments radially outwardly from the axis and expanding the cylindrical outer working surface, and each of the first and second linear guide rails moves radially inward along the thrust plate interior surface and the actuator outer surface in response to movement of the actuator toward the first position, thereby moving each of the segments radially inwardly toward the axis and collapsing the cylindrical outer working surface.

In some embodiments, the tire building drum can comprise a plurality of first guide followers mounted in circumferentially spaced apart locations about the thrust plate interior surface, each first guide follower slidably engaging one of the first linear guide rails and limiting the guide rail to radial movement along the thrust plate interior surface. In some embodiments, each first guide follower can be mounted along a radially outer edge of the thrust plate interior surface. In some embodiments, the tire building drum can comprise a plurality of second guide followers mounted in circumferentially spaced apart locations about the actuator outer surface, each second guide follower slidably engaging one of the second linear guide rails and limiting the guide rail to radial movement along the actuator outer surface as the actuator moves between the first and second positions. Each second guide follower can be mounted along a radially outer edge of the actuator outer surface. Each first guide follower can be adjacent inner surfaces of the segments when the actuator is in the first position. Each second guide follower can be adjacent inner surfaces of the segments when the actuator is in the first position. Each of the first and second guide followers can be adjacent a second end of a corresponding linear guide rail when the actuator is in the second position. In some embodiments, each first linear guide rail second end can be adjacent a second end of a corresponding second linear guide rail.

In some embodiments, the tire building drum can comprise a plurality of ramp members disposed in circumferentially spaced apart locations about the shaft between the actuator and the thrust plate. Each ramp member can have an axially extending, radially outer end secured along an inner surface of one of the segments, a first side surface extending parallel to the thrust plate interior surface, and a second side surface extending parallel to the actuator outer surface. Each first linear guide rail can be fixed to a corresponding one of the ramp member first side surfaces. Each second linear guide rail can be fixed to a corresponding one of the ramp member second side surfaces. In some embodiments, each ramp member can define a substantially flat, right triangular shape extending along an axial dimension of the drum and radially outwardly from the axis. Each ramp member can be biased toward the axis. In some embodiments, the tire building drum can further comprise at least one elastically resilient band extending circumferentially about the axis and biasing the ramp members toward the axis when the actuator is not in the first position.

In some embodiments, the actuator can define a cylindrical inner surface sized and shaped to conform to the shaft outer circumference and to limit movement of the actuator to sliding movement along the shaft. The shaft can define an annular flange extending radially outwardly from the shaft second end, the actuator abutting the flange in the first position. The actuator can define a circumferential leading portion facing the thrust plate interior surface, the leading portion abutting the thrust plate interior surface in the second position.

Example embodiments of the present general inventive concept can also be achieved by providing a tire building drum for forming a component of a tire and having opposite first and second ends and a central axis. A shaft can extend along the axis, the shaft defining an inwardly tapered portion proximate the tire building drum first end. A plurality of substantially arcuate segments can be arranged in a side-by-side circumferential relationship with respect to one another about the shaft to define a segmented, radially expandable and collapsible cylindrical outer working surface. An annular thrust plate can extend radially outwardly from the shaft axially outward of the tapered portion, the thrust plate defining a substantially planar axially interior surface. An annular actuator can be received along the shaft and movable along the axis between a first position proximate the tire building drum second end and a second position proximate the thrust plate interior surface, the actuator defining a tapered annular outer surface. A plurality of radially positionable ramp members can be disposed in circumferentially spaced apart locations about the shaft between the actuator and the thrust plate. Each ramp member can define an axially extending, radially outward surface secured along an interior surface of one of the segments and a radially inward end receivable along the inwardly tapered portion of the shaft proximate the thrust plate when the actuator is in the first position. Each ramp member outer surface can have a first end extending axially toward the tire building drum first end and a second end extending axially toward the tire building drum second end. A plurality of first guide rails can be provided, with each first guide rail secured along an associated ramp member and extending between the radially inward end of the associated ramp member and the radially outer surface second end. A plurality of second guide rails can be provided, with each second guide rail secured along an associated ramp member and extending between the radially inward end of the associated ramp member and the radially outer surface first end. A plurality of first guide followers can be disposed in circumferentially spaced apart locations about the actuator outer surface, each first guide follower slidably engaging one of the first guide rails to limit the associated ramp member to radial movement along the actuator outer surface. A plurality of second guide followers can be disposed in circumferentially spaced apart locations about the thrust plate interior surface, each second guide follower slidably engaging one of the second guide rails to limit the associated ramp member to radial movement along the thrust plate interior surface. In some embodiments, each ramp member may move radially outward along the thrust plate interior surface and the actuator outer surface in response to movement of the actuator toward the second position, thereby expanding the cylindrical outer working surface, and each ramp member may move radially inward along the thrust plate interior surface and the actuator outer surface in response to movement of the actuator toward the first position, thereby collapsing the cylindrical outer working surface.

In some embodiments, each first guide follower may be mounted along a radially outer edge of the actuator outer surface, and each second guide follower may be mounted along a radially outer edge of the thrust plate interior surface. In some embodiments, each ramp member may be biased toward the axis. In some embodiments, the actuator may define a circumferential leading portion facing the thrust plate interior surface, the leading portion abutting the thrust plate interior surface in the second position.

BRIEF DESCRIPTION OF THE SEVERAL VIEWS OF THE DRAWINGS

The above-mentioned features of the invention will become more clearly understood from the following detailed description of the invention read together with the drawings in which:

FIG. 9 is a cross-sectional side view showing another embodiment of a tire building drum constructed in accordance with several features of the present general inventive concept, with the tire building drum shown in a first position;

FIG. 10 is a cross-sectional side view showing the tire building drum of FIG. 9 in a second position

DETAILED DESCRIPTION OF THE INVENTION

Reference will now be made to example embodiments of the present general inventive concept, some of which are illustrated in the accompanying drawings and illustrations. The example embodiments are described herein, and with reference to the figures, in order to explain the present general inventive concept and to assist the reader in gaining a comprehensive understanding of the methods, apparatuses, and/or systems described herein. Accordingly, various changes, modifications, and equivalents of the methods, apparatuses, and/or systems described herein will be understood and suggested to those of ordinary skill in the art.

Figure 1:
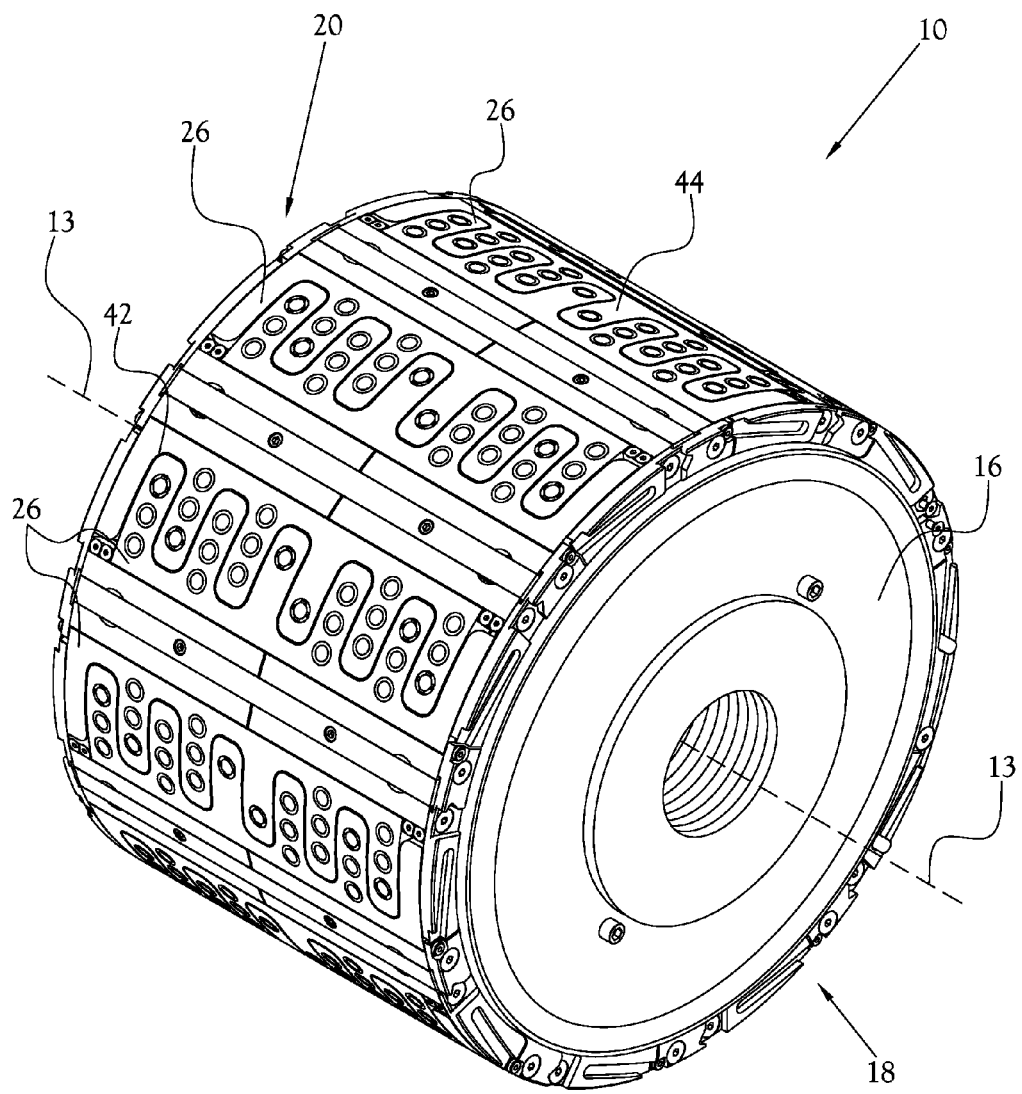
FIG. 1 is a perspective view showing one embodiment of a tire building drum constructed in accordance with several features of the present general inventive concept.
Figure 2:
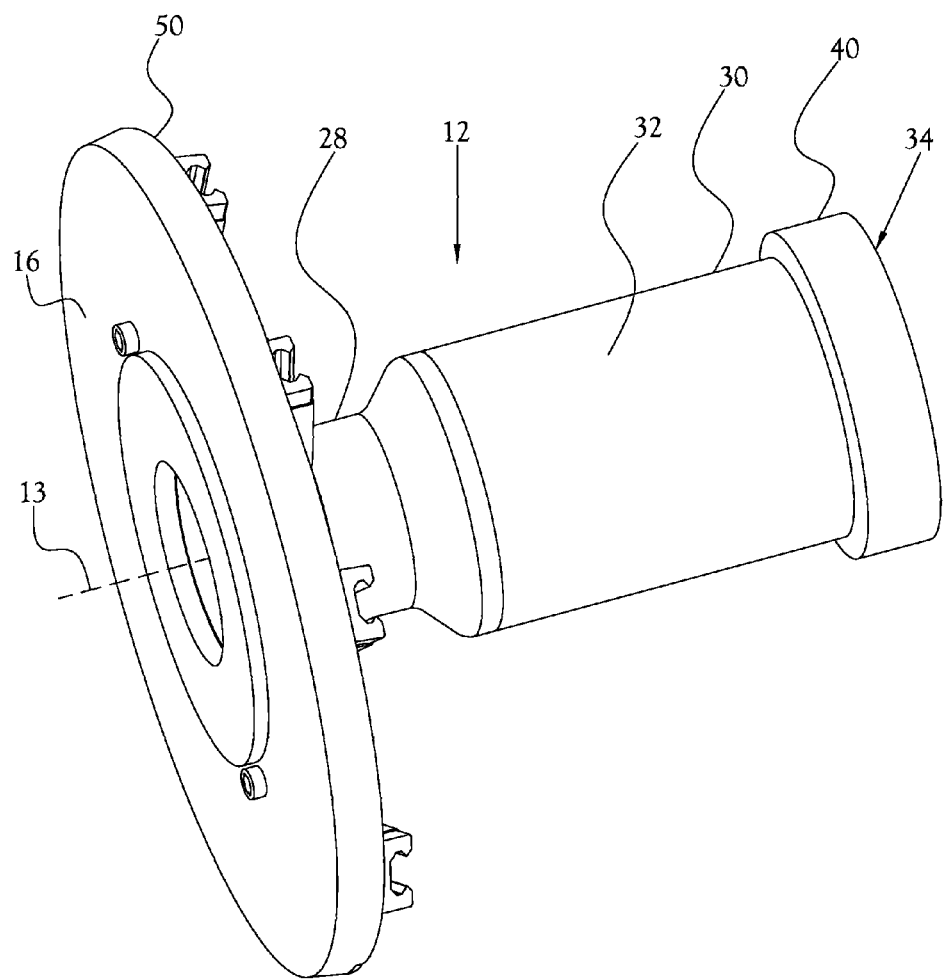
FIG. 2 is a perspective view showing the thrust plate and shaft portions of the tire building drum of FIG. 1.
Figure 3:
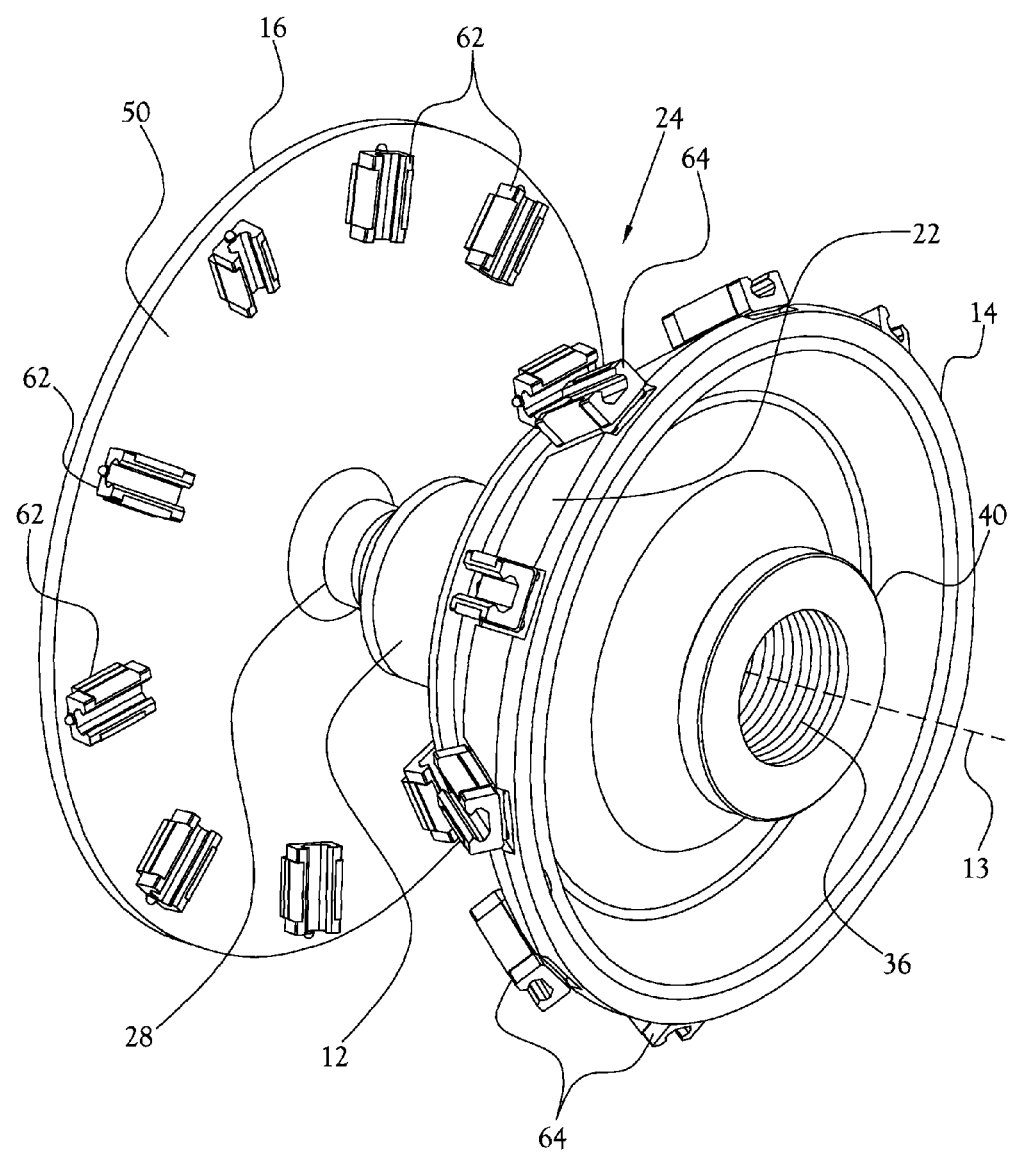
FIG. 3 is a perspective view showing the thrust plate, shaft, and actuator portions of the tire building drum of FIG. 1.

According to several features of the present general inventive concept, a tire building drum is provided having a working surface which is capable of expansion and contraction within an increased range of motion compared to more conventional tire building drums, and with increased stability compared to certain prior art tire building drums. One embodiment of a tire building drum, or "drum," is illustrated generally at 10 in the accompanying figures. Referring initially to FIGS. 1-3, the drum 10 includes generally a main shaft 12 which extends at least partially along a longitudinal central axis 13 of the drum 10. An annular thrust plate 16 extends generally radially outwardly from the shaft 12 at a first end 18 of the drum 10. An actuator 14 is disposed along the central axis 13 at a second end 20 of the drum 10, and is movable along the central axis 13 of the drum 10 in relation to the thrust plate 16. As will be discussed in further detail below, a plurality of outer-circumference-defining arcuate segments 26 are movably mounted about an outer circumference of the drum 10 such that axial movement of the actuator 14 in relation to the thrust plate 16 results in radial movement of the segments 26 toward and away from the central axis 13 of the drum 10, thereby resulting in expansion and contraction of the outer circumference of the drum 10.

FIGS. 1-6 illustrate one embodiment of a drum 10 constructed in accordance with several features of the present general inventive concept. With reference to FIG. 2, in one embodiment, the shaft 12 includes generally an elongated hollow member which extends coaxially along the longitudinal central axis 13 of the drum 10. A first end 28 of the shaft 12 is secured to a central portion of the thrust plate 16 along the central axis 13, and a second end 30 of the shaft 12 extends axially inwardly from the thrust plate 16 and traverses a medial plane of the drum 10, terminating proximate the second end 20 of the drum 10. In several embodiments, the second end 30 of the shaft 12 defines one or more connectors or other features for securing the shaft 12 to a mounting fixture of a tire building machine, of the type known to one of skill in the art. For example, in the illustrated embodiment, the shaft second end 30 defines a generally cylindrical shape having a smooth cylindrical outer surface 32, an open axial end 34, and a threaded cylindrical inner surface 36. The threaded inner surface 36 of the shaft 12 is of sufficient size and shape to allow the second end 30 of the shaft 12 to be threadably secured onto an externally-threaded cylindrical portion of a mounting fixture of a tire building machine.

With reference to FIGS. 2-6, an annular actuator 14 is slidably received along the outer cylindrical surface 32 of the second end 30 of the shaft 12. In several embodiments, the actuator 14 defines a generally conical, truncated-conical, or other such tapered frustum shape. For example, in the illustrated embodiment, the actuator 14 generally defines a smooth, cylindrical inner surface 38 which is shaped to closely conform to the cylindrical outer surface 32 of the main shaft second end 30, and an outer circumferential surface 22 which tapers radially and axially inwardly toward the first end 18 of the drum 10. In the illustrated embodiment, the second end 30 of the shaft 12 defines an annular flange 40 extending radially outwardly therefrom. The cylindrical inner surface 38 of the actuator 14 is configured to slide along the cylindrical outer surface 32 of the shaft second end 30. However, the cylindrical inner surface 38 of the actuator 14 is not sufficiently large in diameter to receive the flange 40 of the shaft second end 30 therethrough. Thus, the flange 40 and the thrust plate 16 cooperate to limit slidable movement of the actuator 14 along the main shaft 12 between a first position (see FIG. 5), in which the actuator 14 is adjacent the flange 40, and a second position (see FIG. 6), in which the actuator 14 is adjacent an inner surface 50 of the thrust plate 16.

The tapered, annular outer surface 22 of the actuator 14 cooperates with the inner surface 50 of the thrust plate 16 to define a radially-inwardly tapered annular void space 24 between the actuator 14 and the thrust plate 16. The annular void space 24 has an axial dimension which is generally parallel to the central axis 13 of the drum 10 and which is governed by the distance of separation between the actuator 14 and the thrust plate 16. In other words, the axial length of the annular void space 24 is expandable and contractible as the result of movement of the actuator 14 between the first and second positions.

Figure 4:
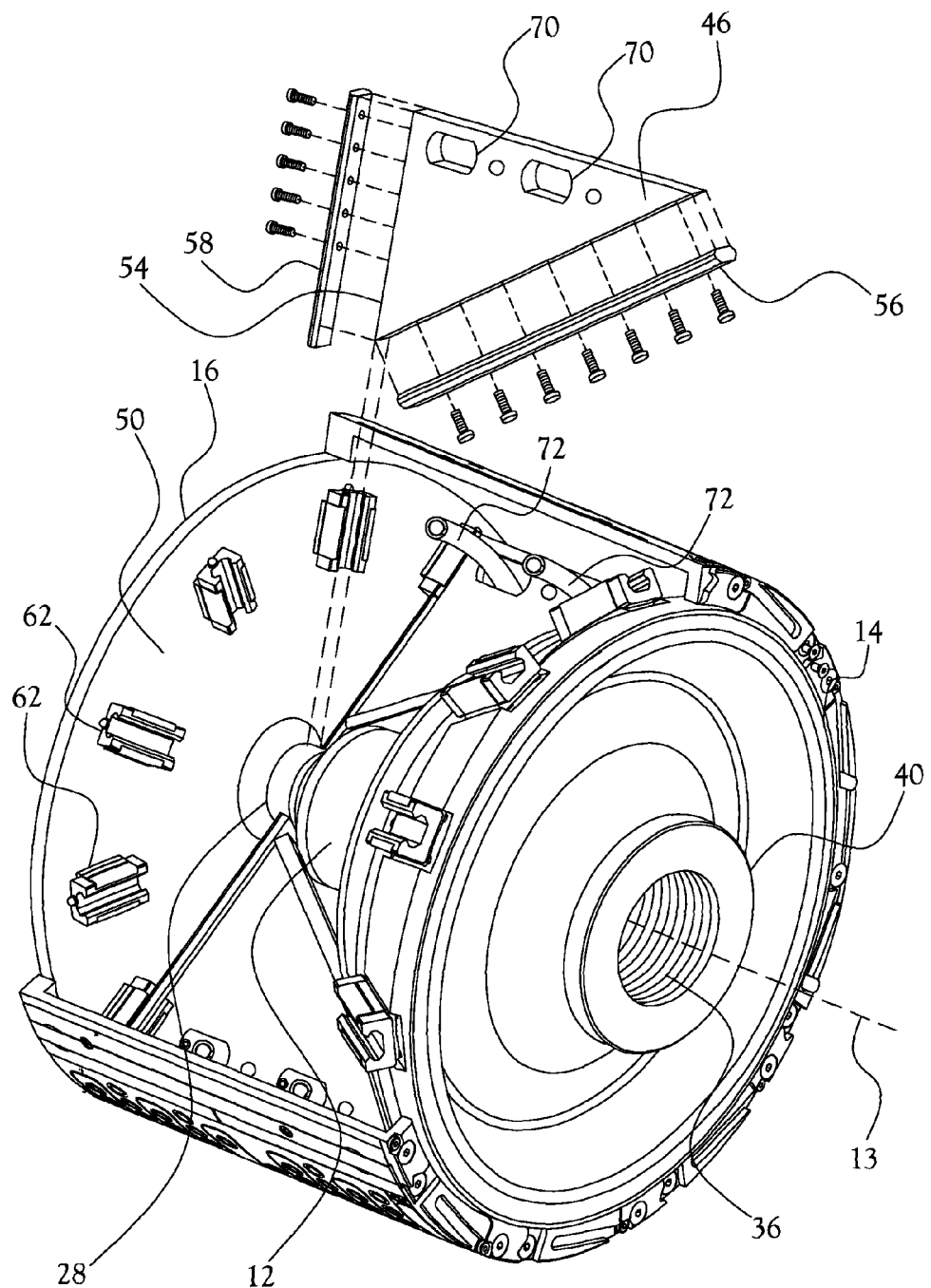
FIG. 4 is a partial cutaway, partially exploded perspective view of the tire building drum of FIG. 1.
Figure 5:
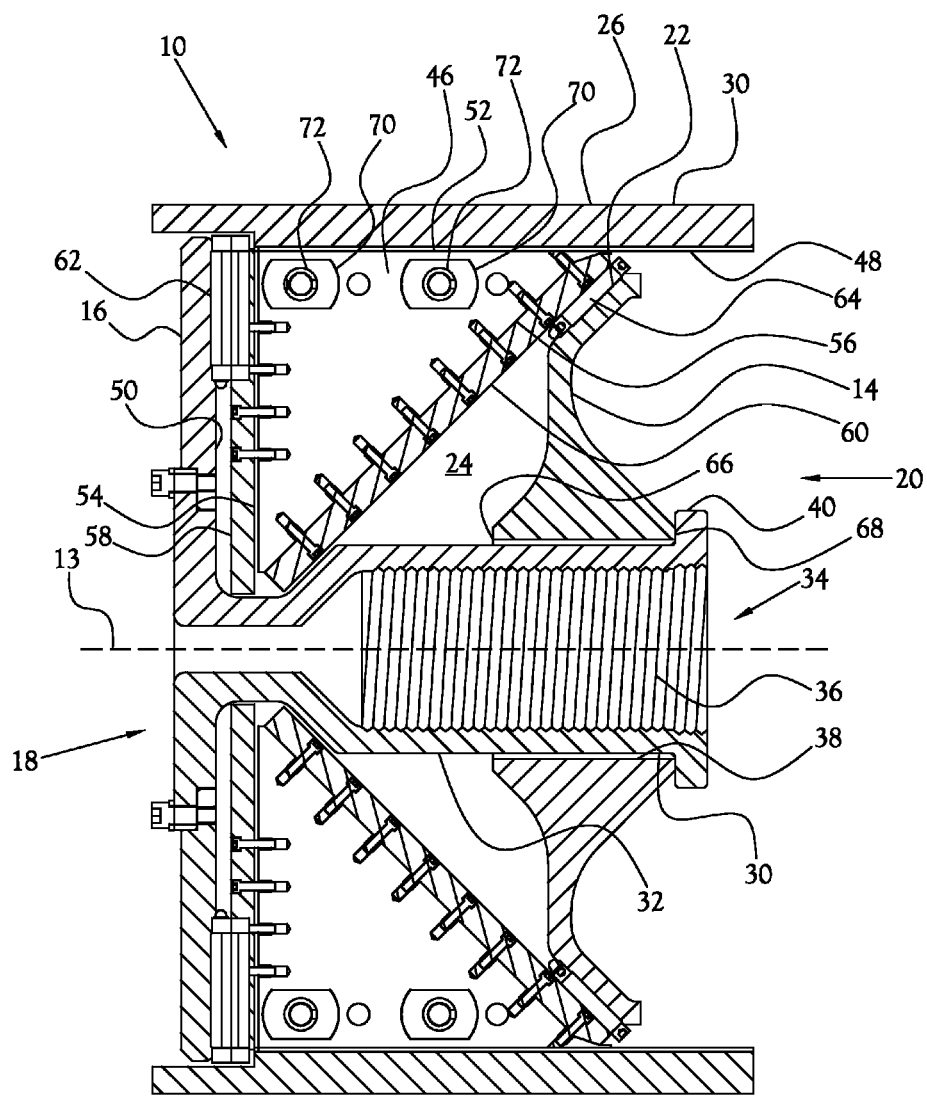
FIG. 5 is a cross-sectional side view showing the tire building drum of FIG. 1 in a first position.
Figure 6:
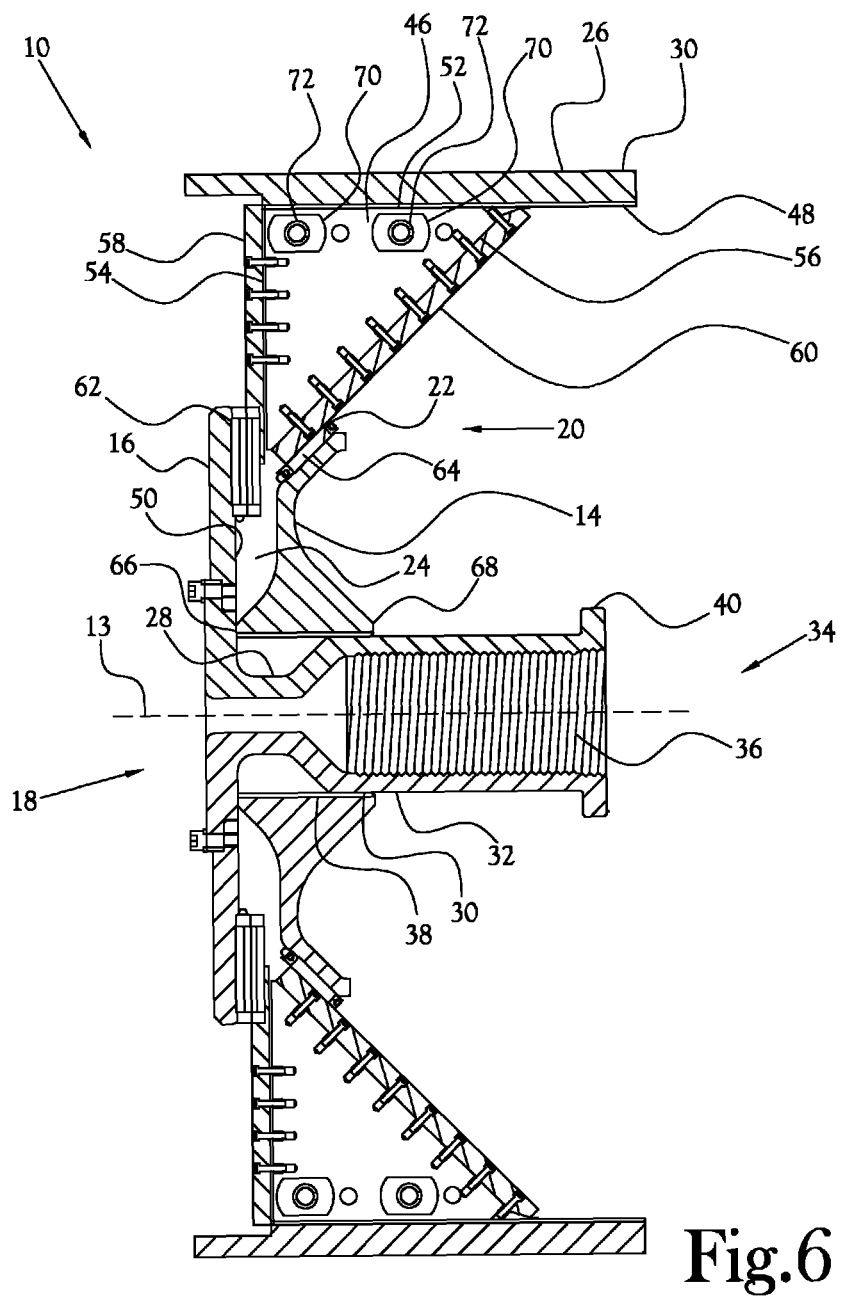
FIG. 6 is a cross-sectional side view showing the tire building drum of FIG. 1 in a second position.

Referring to FIG. 1, the drum 10 further includes a plurality of outer-circumference-defining arcuate segments 26 having at least partially mating side edges 42, such that the segments 26 may fit adjacent one another to collectively define a cylindrical outer working surface 44 of the drum 10. As shown in FIGS. 3-6, a plurality of ramp members 46 are provided in a generally cylindrical configuration within the annular void space 24 between the actuator 14 and the thrust plate 16, with each ramp member 46 being secured to an inner surface 48 of a corresponding segment 26. As shown in FIGS. 4-6, the perimeter of each ramp member 46 is generally trapezoidal or triangular in shape, and in the illustrated embodiment is right-triangular, defining a radially outwardly facing surface 52 which is generally parallel to the central axis 13 of the drum 10 and fixed in relation to an inner surface 48 of a corresponding segment 26, a first side surface 54 extending generally radially outwardly from the central axis 13 along the thrust plate inner surface 50, and a second side surface 56 extending at an angle radially outwardly from the central axis 13 axially toward the second end 20 of the drum 10 along the tapered annular surface 22 of the actuator 14.

In accordance with several features of the present general inventive concept, a plurality of guide mechanisms are interposed between the thrust plate 16 and each ramp member first side surface 54, and between the actuator 14 and each ramp member second side surface 56, to limit movement of each ramp member 46 to radial movement toward and away from the central axis 13 of the drum 10 along the tapered annular surface 22 of the actuator 14 and along the interior surface 50 of the thrust plate 16. For example, in the present embodiment, an elongated first guide rail 58 is fixed along the length of the first side surface 54 of each ramp member 46, and an elongated second guide rail 60 is fixed along the second side surface 56 of each ramp member 46. Each first and second guide rail 58, 60 defines a ridge, channel or track-like guide surface which extends along a length of the guide rail 58, 60. For each first guide rail 58, a first guide block 62 is fixed to the inner surface 50 of the thrust plate 16 at a location along the outer periphery of the thrust plate inner surface 50 corresponding to a location of the associated first guide rail 58. Likewise, for each second guide rail 60 a second guide block 64 is fixed to the outer periphery of the tapered annular surface 22 of the actuator 14 at a location along a circumference of the actuator 14 corresponding to a location of the associated second guide rail 60. Each guide block 62, 64 defines a channel which is adapted to mate with and slidably engage the guide surface of an associated guide rail 58, 60, such that the guide rail 58, 60 is slidable along its length with respect to the associated first or second guide block 62, 64, yet is limited to such sliding movement radially inward and outward with respect to the central axis 13 of the drum 10.

It will be recognized that, because each guide rail 58, 60 is fixed to an associated ramp member 46, and because each guide block 62, 64 associated with each guide rail 58, 60 is fixed to either thrust plate 16 or the actuator 14, the ability of each ramp member 46 to move in relation to the actuator 14 and the thrust plate 16 in directions other than along the lengths of associated guide rails 58, 60 is governed by the specific tolerance of conformity between the guide rails 58, 60 and the channels of the guide blocks 62, 64. Accordingly, in several embodiments, each channel of each guide block 62, 64 has a cross-sectional shape which closely conforms to at least a portion of the cross-sectional shape of the associated guide rail 58, 60, such that the ability of each ramp member 46 to move in relation to the actuator 14 and thrust plate 16 in directions other than along the lengths of associated guide rails 58, 60 is minimized.

In accordance with several features of the present general inventive concept, in several embodiments, the guide mechanisms and other features of the drum 10 are dimensioned and configured to allow a relatively large range of motion of the ramp members 46, thus allowing a relatively large range of expansion and contraction of the cylindrical outer working surface 44 of the drum 10, while maintaining stability of the individual arcuate segments 26 in relation to one another. For example, in the illustrated embodiment, the shaft first end 28 tapers radially inwardly along the axial length of the shaft 12 toward the thrust plate 16, such that the axially inward limits of the annular void space 24 are defined by the inwardly tapered portion of the shaft first end 28. In this embodiment, when the actuator 14 is in the first position nearest the second end 20 of the drum 10 (see FIG. 5), each ramp member 46 is positioned radially inwardly toward the shaft 12 between the actuator 14 and the thrust plate 16. In this position, each of the first and second guide rail 58, 60 extends radially inwardly from a respective axial end of the inner surface 48 of a corresponding segment 26 to the radially inwardly tapered portion of the shaft first end 28. In a the illustrated embodiment, when the drum 10 is in the first position, the thrust plate 16 and the actuator 14 each extend radially outwardly from the central axis 13 to a distance approximately even with the interfaces of the ramp members 46 with the arcuate segments 26. Thus, when the actuator 14 is positioned in the first position, each of the guide blocks 62, 64 is positioned at a radially outward end of a respective guide rail 58, 60, adjacent the inner surface 48 of a corresponding segment 26.

As shown in FIG. 6, movement of the actuator 14 along the shaft 12 toward the second position reduces the axial length of the annular void space 24 and forces each of the guide blocks 62, 64 axially toward their respective guide rails 58, 60. Because each of the second guide rails 60 extends at an angle from the inwardly-tapered shaft first end 28 radially outward and axially toward the second end 20 of the drum 10, such axial assertion of the guide blocks 62, 64 against their respective guide rails 58, 60 forces each ramp member 46 to slide radially outwardly from between the actuator 14 and the thrust plate 16 along the first and second guide blocks 62, 64. Thus, movement of the actuator 14 toward the thrust plate 16 results in radial expansion of the ramp members 46 in relation to the shaft 12 and corresponding radial expansion of the working surface 44 defined by the arcuate segments 26. Conversely, movement of the actuator 14 away from the thrust plate 16 and toward the first position expands the axial length of the annular void space 24, thereby causing each ramp member to slide radially inwardly along the first and second guide blocks 62, 64 toward the central axis 13 of the drum 10, and thereby collapsing the working surface 44 defined by each of the arcuate segments 26. Thus, by moving the actuator 14 between the first and second positions along the shaft 12, the working surface 44 of the drum 10 may be expanded and collapsed.

In several embodiments, the actuator 14 is dimensioned such that, when the drum 10 is in the second position, the first and second guide blocks 62, 64 are each positioned at radially inward ends of their respective guide rails 58, 60. For example, in the illustrated embodiment, the actuator 14 defines a circumferential leading edge 66 at an interface of the cylindrical inner surface 38 of the actuator 14 and a side surface of the actuator 14 facing the thrust plate 16. The leading edge 66 of the actuator 14 extends proud to the remainder of the actuator 14, such that, when the drum 10 is in the second position, the leading edge 66 of the actuator 14 abuts the inner surface 50 of the thrust plate 16. In this configuration, each of the second guide blocks 64 is positioned at a radially inward end of a corresponding second guide rail 60. Similarly, in the illustrated embodiment, the actuator 14 defines a circumferential trailing edge 68 at the interface of the cylindrical inner surface 38 of the actuator 14 and a side surface of the actuator 14 facing the flange 40 of the shaft second end 30. The trailing edge 68 extends axially outwardly of the remainder of the actuator 14 such that, when the drum 10 is in the first position, the trailing edge 68 of the actuator 14 abuts the flange 40. In this configuration, each of the second guide blocks 64 is positioned at a radially outward end of a corresponding second guide rail 60. Those of skill in the art will recognize other suitable features which may be included for defining the positional relationship of the actuator 14 in relationship to the thrust plate 16 and flange 40 in the first and second positions without departing from the spirit and scope of the present general inventive concept. For example, in other embodiments, suitable stops may be positioned along the thrust plate 16, along the flange 40, at radially inward ends of the guide rails 58, 60 and/or along the shaft 12 to define the first and second positions of the actuator 14 and to limit continued movement of the actuator 14 toward the thrust plate 16 beyond the first and second positions.

With reference to FIGS. 4-6, in certain embodiments, a plurality of circumferentially-extending through openings 70 are provided at corresponding locations through each of the ramp members 46, and at least one elastically resilient band 72 is received through each of the circumferentially corresponding openings 70 about a circumference of the drum 10. The bands 72 are configured to stretch when the ramp members 46 are expanded through movement of the actuator 14 toward the second position, and to assert radially inward force on the ramp members 46, thereby urging the ramp members 46 radially inward toward the shaft 12 of the drum 10 when the actuator is moved toward the first position. Thus, in these embodiments, the actuator 14 and the thrust plate 16 may be driven toward one another from the first position to the second position by a pneumatic, hydraulic, or other such device, and, upon disengagement of the device, the bands 72 may assist in forcing the ramp members 46 radially inward toward the shaft 12 and allowing the actuator 14 and thrust plate 16 to return to the first position. However, it will be recognized that inclusion of the at least one band 72 and corresponding openings 70 in the ramp members 46 is not necessary to accomplish the drum 10 according to the present general inventive concept. To this end, in other embodiments, the drum 10 may be driven by a rotary actuator or other such device wherein the actuator 14 and/or thrust plate 16 may be positively driven between the first and second positions.

It will be appreciated by one of skill in the art that the above-described configuration of the inwardly tapered shaft first end 28, in combination with the dimensioning of the peripheries of the thrust plate 16 and actuator 14, the positioning of the guide blocks 62, 64 at such peripheries, and the configuration of the ramp members 46 and the first and second guide rails 58, 60 such that each first and second guide rail 58, 60 extends radially inwardly to the inwardly-tapered shaft first end 28 and radially outwardly to respective opposite ends of the internal surfaces 48 of the segments 26, serves to substantially maximize the effective range of expansion and contraction of the working surface 44 of the drum 10. Furthermore, it will be appreciated by one of skill in the art that the above-discussed fixation of the guide rails 58, 60 to respective ramp members 46, and the above-discussed fixation of the various guide blocks 62, 64 to the thrust plate 16 and actuator 14, serves to limit the presence of tolerances or dimensional allowances between mating surfaces of the above-discussed guide mechanisms, thereby maintaining stability of the segments 26 throughout expansion and contraction of the working surface 44 of the drum 10. These and other advantages of the present general inventive concept will become apparent to one of skill in the art.

Several additional embodiments exist which may be employed to accomplish a tire building drum in accordance with various features of the present general inventive concept. For example, it will be recognized that, in some embodiments, the positional relationship of the first and second guide rails 58, 60 and the first and second guide blocks 62, 64 may be reversed without departing from the spirit and scope of the present general inventive concept. In other words, the first guide rails 58 may be mounted in a radial configuration about the perimeter of the inner surface 50 of the thrust plate 16, with the first guide blocks 62 being mounted along the lengths of the first side surfaces 54 of the ramp members 46. Likewise, the second guide rails 60 may be mounted in a radial configuration about the outer surface 22 of the actuator 14, with second guide blocks 64 being mounted along the lengths of the second side surfaces 56 of the ramp members 46.

FIGS. 7-18 illustrate cross-sectional views of several additional embodiments constructed in accordance with several features of the present general inventive concept. In several embodiments, a first type of guide mechanism is interposed between each ramp member 46 and either the actuator 14 or the thrust plate 16, and a second type of guide mechanism is interposed between each ramp member 46 and the other of the actuator 14 or the thrust plate 16. In several embodiments, one type of guide mechanism is configured to provide increased stability between each ramp member 46 and its associated actuator 14 or thrust plate 16, while the other type of guide mechanism is configured to allow increased range of movement between each ramp member 46 and its associated actuator 14 or thrust plate 16.

Figure 7:
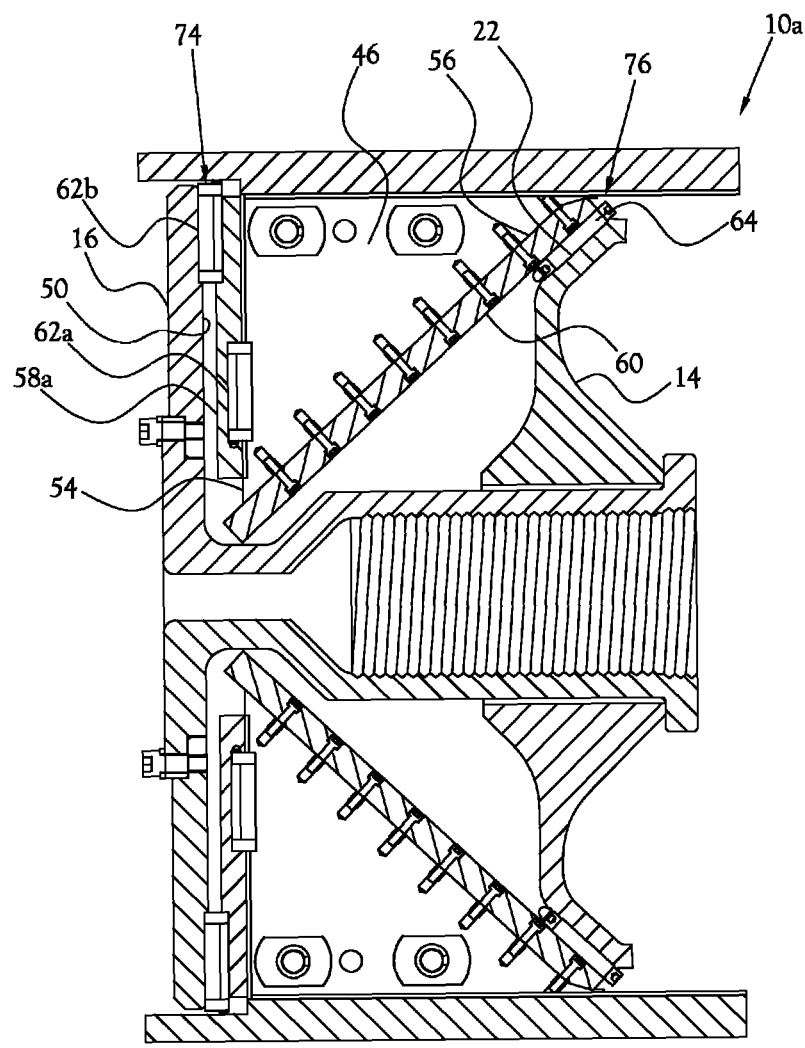
FIG. 7 is a cross-sectional side view showing another embodiment of a tire building drum constructed in accordance with several features of the present general inventive concept, with the tire building drum shown in a first position.
Figure 8:
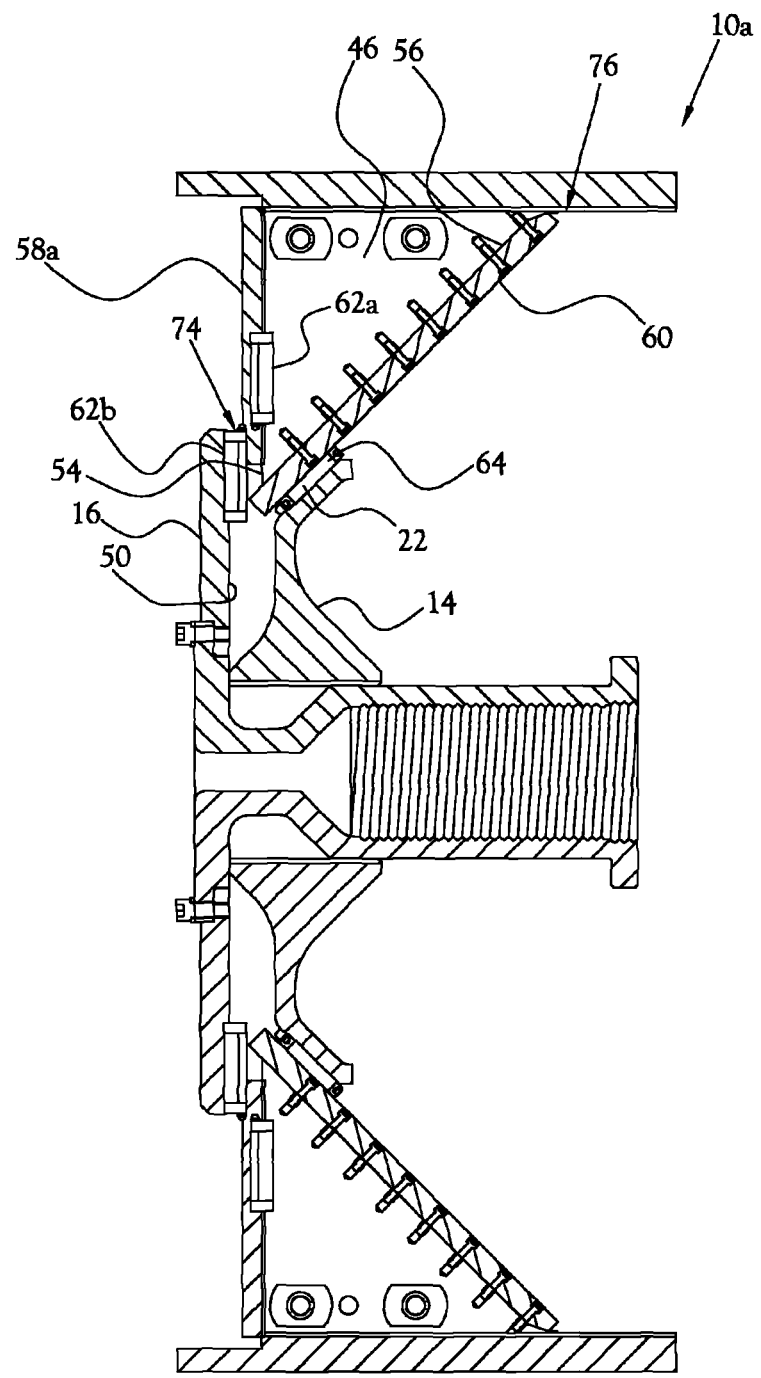
FIG. 8 is a cross-sectional side view showing the tire building drum of FIG. 7 in a second position.

For example, in the embodiment of FIGS. 7 and 8, a plurality of first guide mechanisms 74 are provided, with one first guide mechanism 74 being interposed between each ramp member 46 and the thrust plate 16. In the illustrated embodiment, each first guide mechanism 74 comprises a first guide block 62a fixed along the first side surface 54 of a respective ramp member 46, and a second guide block 62b fixed to the interior surface 50 of the thrust plate 16 at a location along an outer perimeter of the thrust plate 16 in radial alignment with the associated first guide block 62a. Similar to the embodiment discussed above, each of the first and second guide blocks 62a, 62b defines an elongated channel, and in the illustrated embodiment, each elongated channel of each first guide block 62a is configured to face, and radially align with, an elongated channel of the corresponding second guide block 62b. In the illustrated embodiment, each first guide mechanism 74 further includes an intermediary guide rail 58a interposed between, and in slidable engagement with, each of the channels of the corresponding first and second guide blocks 62a, 62b. Each intermediary guide rail 58a defines first and second guide surfaces along opposite longitudinal sides of the guide rail 58a, such that each first guide block channel is in slidable engagement with a first guide surface along a first longitudinal side of the intermediary guide rail 58a, and each second guide block channel is in slidable engagement with a second guide surface along a second longitudinal side of the intermediary guide rail 58a.

A plurality of second guide mechanisms 76 are provided, with one second guide mechanism 76 being interposed between each ramp member 46 and the outer surface 22 of the actuator 14. In the illustrated embodiment, each second guide mechanism 74 comprises an elongated guide rail 60 fixed along the second side surface 56 of the ramp member 46, and a guide block 64 fixed to the annular outer surface 22 of the actuator 14 at a location along a circumference of the actuator 14 corresponding to a location of the associated guide rail 46.

Referring to FIG. 7, as discussed above, with the actuator 14 in the first position, each guide block 64 of each second guide mechanism 76 is positioned at a radially outward end of an associated guide rail 60 of the second guide mechanism 76. With regard to the first and second guide blocks 62a, 62b forming each first guide mechanism 74, each first guide block 62a is positioned at a radially inward end of an associated intermediary guide rail 58a, and each second guide block 62b of each first guide mechanism 74 is positioned at a radially outward end of an associated intermediary guide rail 58a. Referring to FIG. 8, with the actuator 14 in the second position, each guide block 64 of each second guide mechanism 76 is positioned at a radially inward end of an associated guide rail 60 of the second guide mechanism 76. In this configuration, each first guide block 62a of each first guide mechanism 74 is positioned at a radially outward end of an associated intermediary guide rail 58a, and each second guide block 62b is positioned at a radially inward end of an associated intermediary guide rail 58a.

In this embodiment, it will be recognized that the second guide mechanisms 76 cooperate to maintain stability between the actuator 14 and the various segments 26 forming the cylindrical outer working surface 30 of the drum 10 throughout expansion and contraction of the cylindrical outer working surface 44 by limiting the presence of tolerances or dimensional allowances between mating surfaces of the above-discussed second guide mechanisms 76. It will be further recognized that the range of movement of each ramp member 46 in relation to the actuator 14 is governed by the length that the guide block 64 of each second guide mechanism 76 may travel between respective ends of the associated guide rail 60. However, the range of movement of each ramp member 46 in relation to the thrust plate 16 is governed by the sum of the length that the first guide block 62a of each first guide mechanism 74 may travel between respective ends of the associated intermediary guide rail 58a and the length that the second guide block 62b may travel between respective ends of the associated intermediary guide rail 58a. Therefore, it will be recognized that, when comparing first and second guide mechanisms 74, 76 of equal overall length, the first guide mechanisms 74 may provide for an increased range of movement of the ramp members 46 as compared to the second guide mechanisms 76. Alternatively, the first guide mechanisms 74 may provide for an equal range of movement of the ramp members 46 as the second guide mechanisms 76 while employing an intermediary guide rail 58a having a shorter radial length than is required by the guide rail 60 of the second guide mechanism 76. In light of the above, in the embodiment of FIGS. 7-8, each guide rail 64 of each second guide mechanism 76 extends along the entire length of the second side surface 56 of the ramp member 46, and further extends radially inwardly beneath the first guide mechanism 74. Thus, the second guide mechanism 76 is configured to allow a maximized range of expansion and contraction of the drum 10a, while further assisting in maintaining stability between each ramp member 46 and the actuator 14.

FIGS. 9 and 10 illustrate another embodiment of a drum 10b constructed in accordance with several features of the present general inventive concept. In the embodiment of FIGS. 9 and 10, a plurality of first guide mechanisms 74b are provided, with one first guide mechanism 74b being interposed between the second side surface 56 of each ramp member 46 and the actuator 14. A plurality of second guide mechanisms 76b of the type described above are provided, with one second guide mechanism 76 being interposed between the first side surface 54 of each ramp member 46 and the thrust plate 16. In the illustrated embodiment, the guide rail 60b of each second guide mechanism 76b is fixed along the length of the second side surface 54 of a corresponding ramp member 46, and the guide block 64b of each second guide mechanism 76b is fixed along the interior surface 50 of the thrust plate 16 at a location along an outer circumference of the thrust plate 16 in radial alignment with the guide rail 60b. The first guide block 62c of each first guide mechanism 74b is fixed to the second side surface 56 of a corresponding ramp member 46, and the second guide block 62d of each first guide mechanism 74b is fixed to the annular surface 22 of the actuator 14. Thus, in the embodiment of FIGS. 9 and 10, the second guide mechanism 76b provides improved stability between each ramp member 46 and the thrust plate 16, while a void space is provided between each ramp member 46 and the actuator 14, radially inwardly of each first guide mechanism 74b.

Figure 11:
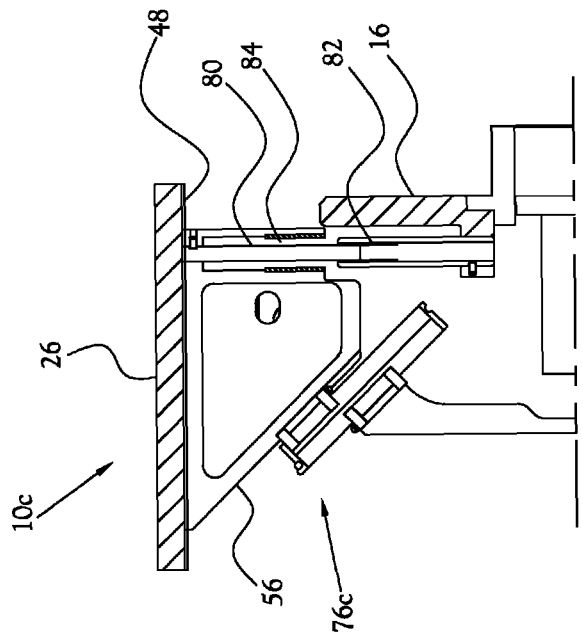
FIG. 11 is a partial cross-sectional side view showing another embodiment of a tire building drum constructed in accordance with several features of the present general inventive concept, with the tire building drum shown in a first position.
Figure 12:
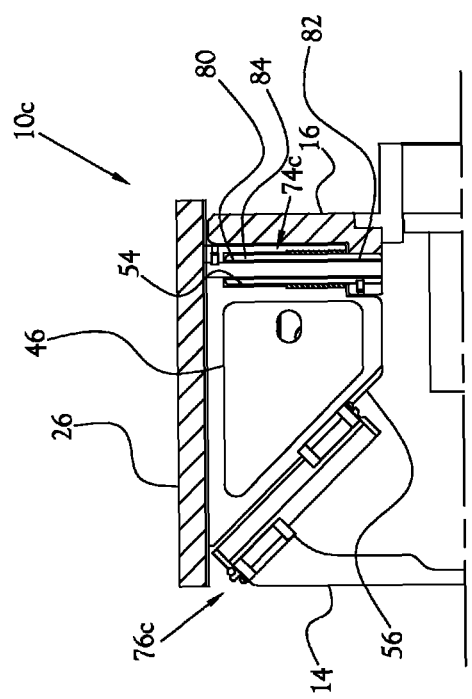
FIG. 12 is a partial cross-sectional side view showing the tire building drum of FIG. 11 in a second position

FIGS. 11 and 12 illustrate another embodiment of a drum 10c constructed in accordance with several features of the present general inventive concept. In the embodiment of FIGS. 11 and 12, a plurality of first guide mechanisms 74c are provided, with one first guide mechanism 44c being interposed between the first side surface 54 of each ramp member 46 and the thrust plate 16. In the illustrated embodiment, each first guide mechanism 74c comprises an elongated cylindrical member 80 slidably received within an elongated tubular member 82 in telescopic fashion, such that the cylindrical member 80 is limited to sliding movement along a coaxis of the cylindrical member 80 and the tubular member 82. In the illustrated embodiment, each first guide mechanism 74c is received within a void space 84 defined along the first side surface 54 of a corresponding ramp member 46. Each cylindrical member 80 is secured to a portion of the ramp member 46 within the void space 84 proximate an interior surface 48 of a corresponding circumference-defining segment 26 and proximate the thrust plate 16, and each tubular member 76 is secured to a portion of the main shaft 12 proximate the thrust plate 16. Each void space 84 defined along the first side surface 54 of each ramp member 46 is sized and shaped to closely conform to an exterior surface of the tubular member 82, such that the void space 84 and tubular member 82 cooperate to provide stability to the ramp member 46 during expansion and collapse of the drum 10c. In the embodiment of FIGS. 11 and 12, a plurality of second guide mechanisms 76c are provided as discussed above with regard to FIGS. 9 and 10, with one second guide mechanism 76c being interposed between the second side member 56 of each ramp member 46 and the actuator 14.

Figure 14:
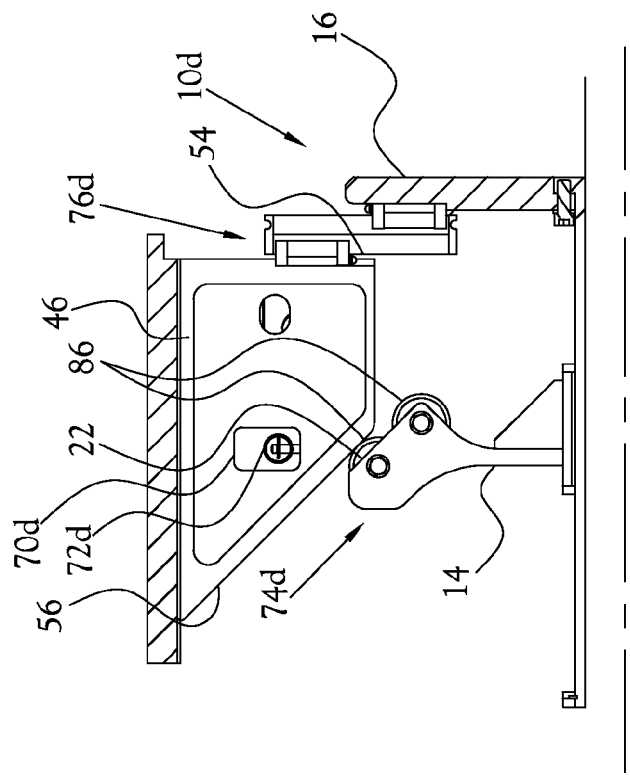
FIG. 14 is a partial cross-sectional side view showing the tire building drum of FIG. 13 in a second position.
Figure 13:
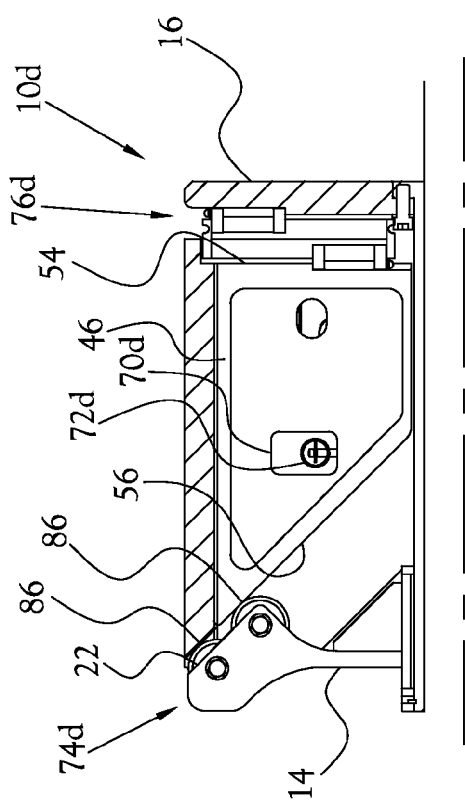
FIG. 13 is a partial cross-sectional side view showing another embodiment of a tire building drum constructed in accordance with several features of the present general inventive concept, with the tire building drum shown in a first position.

FIGS. 13 and 14 illustrate another embodiment of a drum 10d constructed in accordance with several features of the present general inventive concept. In the embodiment of FIGS. 13 and 14, a plurality of first guide mechanisms 74d are provided, with one first guide mechanism 74d being interposed between the second side surface 56 of each ramp member 46 and the actuator 14. In the illustrated embodiment, each first guide mechanism 74d includes a pair of rollers 86 rotatably secured in a tandem orientation along a radial dimension of the tapered annular surface 22 of the actuator 14, between the actuator 14 and an associated second side surface 56 of a ramp member 46. Each of the pair of rollers 86 is configured to roll along the second side surface 56 of an associated ramp member 46 between opposite first and second ends of the second side surface 56 of the ramp member 46. In certain embodiments, each roller 86 defines an annular groove, channel, lip, or other such guide which is configured to engage a corresponding linear guide defined along the second side surface 56 of the ramp member 46, thereby limiting the ramp member 46 from movement along axial dimensions of the rollers 86. In several embodiments, at least one resilient spring member is provided to urge each ramp member 46 toward its associated rollers 86. For example, in the illustrated embodiment, a through opening 70*d* is defined at a central portion of each ramp member 46 along a circumferential direction of the drum 10*d*. A resiliently elastic band 72*d* is received through each of the through openings 70*d* in the ramp members about the circumference of the drum 10*d*, such that the band 72*d* urges each of the ramp members 46 toward the central axis of the drum 10*d*, thereby maintaining contact between the rollers 86 and the associated second side members 56 of the ramp members 46 throughout expansion and collapse of the drum 10*d*.

Figure 16:
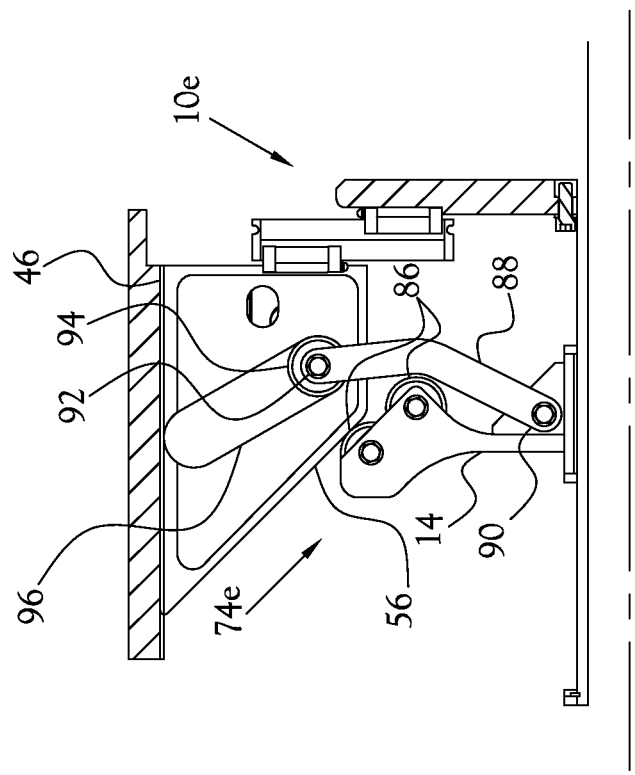
FIG. 16 is a partial cross-sectional side view showing the tire building drum of FIG. 15 in a second position.
Figure 15:
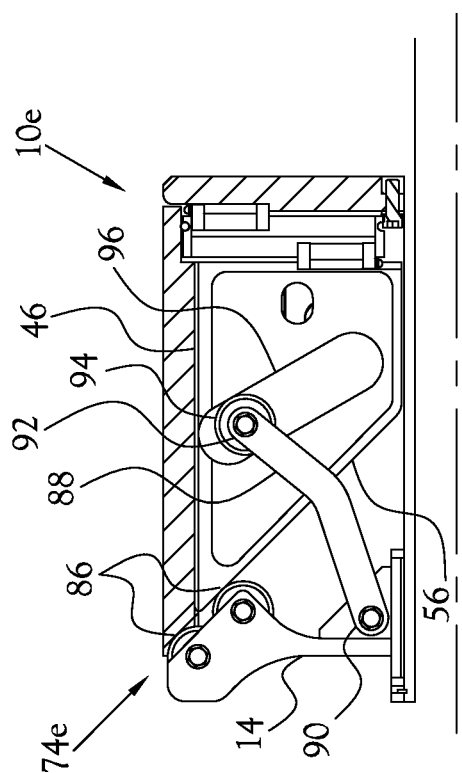
FIG. 15 is a partial cross-sectional side view showing another embodiment of a tire building drum constructed in accordance with several features of the present general inventive concept, with the tire building drum shown in a first position.

FIGS. 15 and 16 illustrate another embodiment of a drum 10*e* constructed in accordance with several features of the present general inventive concept. In the embodiment of FIGS. 15 and 16, in addition to the rollers 86 described above, each first guide mechanism 74*e* disposed between each ramp member 46 and the actuator 14 further includes a cantilevered lever arm 88 which is rotatably secured at a first end 90 thereof to a portion of the actuator 14. Each lever arm 88 is configured to rotate along a plane extending radially outwardly from the drum 10*e*. An additional roller 94 is rotatably secured to a second end 92 of each lever arm 88 and is configured to roll along a slot 96 defined by an associated ramp member 46. The orientation of each slot 96 along its associated ramp member 46 and the orientation, shape, and length of each lever arm 88 in relation to the slot 96 is such that the lever arm 88 and slot 96 cooperate to maintain intimate contact between the rollers 82 and the associated second side surface 56 of the ramp members 46 throughout expansion and collapse of the drum 10*e*, thereby providing stability to the ramp members 46 during expansion and collapse of the drum 10*e*.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A tire building drum for forming a component of a tire, said drum having a central axis and opposite first and second axial ends, said drum comprising:
   a shaft extending along said axis, said shaft defining an outer circumference proximate said second axial end and a tapered portion that tapers radially inwardly along an axial length of the shaft proximate said first axial end such that an outer diameter of said shaft progressively decreases along a circumferentially continuous wall defining an axially inward limit of an annular void space proximate said first axial end, wherein the shaft is hollow such that it has an inner surface with an inner diameter and a threaded portion, the inner diameter progressively decreasing along with the outer diameter at the tapered portion;
   a plurality of substantially arcuate segments arranged in a side-by-side circumferential relationship with respect to one another about said shaft to define a segmented, radially expandable and collapsible cylindrical outer working surface, each said segment having a first end proximate said drum first axial end and a second end proximate said drum second axial end;
   an annular thrust plate extending radially outwardly from said shaft axially outward of said tapered portion, said thrust plate defining a substantially planar axially interior surface;
   an annular actuator received about said shaft and movable along said axis between a first position proximate said drum second end and a second position proximate said drum first end, said actuator defining a radially and axially inwardly tapered annular outer surface;
   a plurality of first linear guide rails, each said first linear guide rail having a first end secured proximate said first end of a respective one of said segments and a second end extending radially inwardly along said thrust plate interior surface;
   a plurality of second linear guide rails, each said second linear guide rail having a first end secured proximate said second end of a respective one of said segments and a second end extending radially and axially inwardly along said actuator outer surface;
   wherein said thrust plate is slidably secured to each said first linear guide rail and said actuator is slidably secured to each said second linear guide rail, and wherein each of said second ends of said first and second linear guide rails extends radially inward of said shaft outer circumference toward and into said annular void space defined on said shaft tapered portion when said actuator is in said first position;
   whereby each of said first and second linear guide rails moves radially outward along said thrust plate interior surface and said actuator outer surface in response to movement of said actuator toward said second position, thereby moving each of said segments radially outwardly from said axis and expanding said cylindrical outer working surface, and each of said first and second linear guide rails moves radially inward along said thrust plate interior surface and said actuator outer surface in response to movement of said actuator toward said first position, thereby moving each of said segments radially inwardly toward said axis and collapsing said cylindrical outer working surface.

2. The tire building drum of claim 1 further comprising a plurality of first guide followers mounted in circumferentially spaced apart locations about said thrust plate interior surface, each said first guide follower slidably engaging a respective one of said first linear guide rails and limiting said first linear guide rails to radial movement along said thrust plate interior surface.

3. The tire building drum of claim 2, each said first guide follower being mounted along a radially outer edge of said thrust plate interior surface.

4. The tire building drum of claim 3 further comprising a plurality of second guide followers mounted in circumferentially spaced apart locations about said actuator outer surface, each said second guide follower slidably engaging a respective one of said second linear guide rails and limiting said second linear guide rails to radial movement along said actuator outer surface as said actuator moves between said first and second positions.

5. The tire building drum of claim 4, each said second guide follower being mounted along a radially outer edge of said actuator outer surface.

6. The tire building drum of claim 5, each said first guide follower being adjacent inner surfaces of said segments when said actuator is in said first position.

7. The tire building drum of claim 5, each said second guide follower being adjacent inner surfaces of said segments when said actuator is in said first position.

8. The tire building drum of claim 5, each of said first and second guide followers being adjacent the second end of its respective one of the linear guide rails to which it is respectively engaged when said actuator is in said second position.

9. The tire building drum of claim 8 wherein each said first linear guide rail second end is adjacent the second end of a corresponding respective one of the second linear guide rails.

10. The tire building drum of claim 1 further comprising a plurality of ramp members disposed in circumferentially spaced apart locations about said shaft between said actuator and said thrust plate, each said ramp member having an axially extending, radially outer end secured along an inner surface of a respective one of said segments, a first side surface extending parallel to said thrust plate interior surface, and a second side surface extending parallel to said actuator outer surface, each said first linear guide rail being fixed to a corresponding one of said ramp member first side surfaces, each said second linear guide rail being fixed to a corresponding one of said ramp member second side surfaces.

11. The tire building drum of claim 10, each ramp member defining a substantially flat, right triangular shape extending along an axial dimension of said drum and radially outwardly from said axis.

12. The tire building drum of claim 10, each said ramp member being biased toward said axis.

13. The tire building drum of claim 12 further comprising at least one elastically resilient band extending circumferentially about said axis and biasing said ramp members toward said axis when said actuator is not in said first position.

14. The tire building drum of claim 1, said actuator defining a cylindrical inner surface sized and shaped to conform to said shaft outer circumference and to limit movement of said actuator to sliding movement along said shaft.

15. The tire building drum of claim 14, said shaft defining an annular flange extending radially outwardly from said shaft second end, said actuator abutting said flange in said first position.

16. The tire building drum of claim 14, said actuator defining a circumferential leading portion facing said thrust plate interior surface, said leading portion abutting said thrust plate interior surface in said second position.

* * * * *